Oct. 27, 1970  L. PAPISH  3,536,367
LOW FRICTION BEARING
Filed Dec. 4, 1968
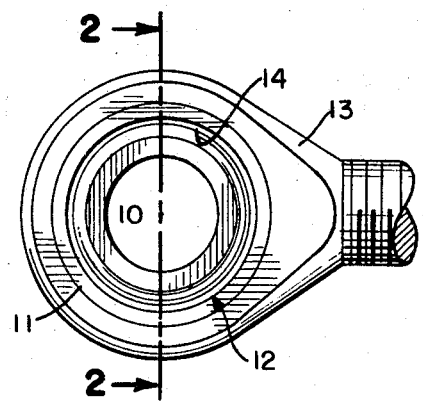
FIG. 1
FIG. 2
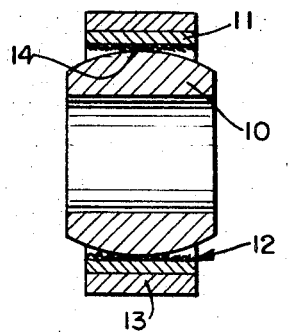
FIG. 3
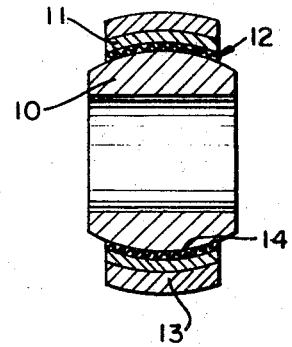
FIG. 4
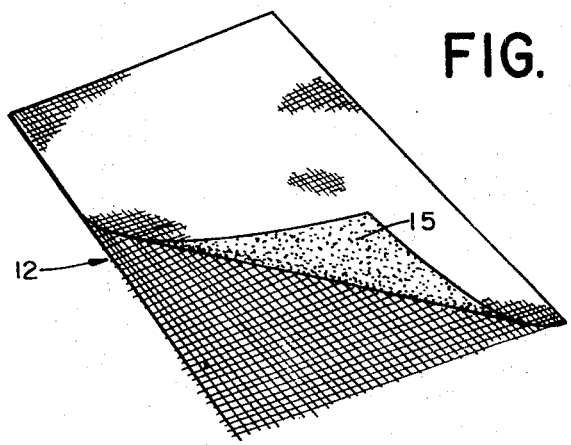
INVENTOR
LEO PAPISH
BY  *N. L. Leek*
ATTORNEY _United States Patent Office_ 3,536,367
Patented Oct. 27, 1970

3,536,367
LOW FRICTION BEARING
Leo Papish, Danbury, Conn. 06810
Filed Dec. 4, 1968, Ser. No. 781,147
Int. Cl. F16c 33/00
U.S. Cl. 308—238               9 Claims

ABSTRACT OF THE DISCLOSURE

A bearing element for a ball joint or the like comprising a fabric composed of amorphous carbon filaments which form the bearing surface. The fabric is impregnated with a base resin and bonded to a backing element by a bonding resin.

---

This invention relates to low friction bearings and more particularly to bearings of the type having a treated fabric disposed to constitute one of the bearing surfaces.

An object is to provide a bearing structure of the above type which is suitable for use in ball joints or similar elements having a bearing surface.

Another object is to provide such a bearing having new and improved features of construction which is suited for commercial production and use.

Other objects and advantages will be apparent as the nature of the invention is more fully disclosed.

The features of the present invention may be embodied in bearing elements of any desired shape having inner and outer elements with a bearing surface therebetween. In the case of a ball joint the inner element is substantially spherical and the outer element constitutes a section of a sphere having an inner surface conforming to the outer surface of the inner element.

The outer element is usually swaged to conform to the spherical contour of the inner element after the parts have been assembled as shown for example in Kravats Patent No. 2,958,927.

On the present case the bearing surface is composed of a fabric made from a carbon based yarn such as a yarn composed of amorphous carbon in continuous filament form or composed of graphite crystals dispersed in such an amorphous base. In some instances the yarn may be coated with Teflon particles deposited from a Teflon dispersion.

After weaving into the form of a fabric strip the latter may be impregnated and coated with a layer of a bonding resin. An additional coating of a Teflon dispersion may be applied to the final bearing surface of the fabric. The fabric is heat set under pressure with the resin in contact with the bearing surface on one of the bearing elements.

The nature of the invention will be better understood from the following description, taken in connection with the accompanying drawing in which a specific embodiment has been set forth for purposes of illustration.

In the drawing:

FIG. 1 is a side elevation of the parts of a rod end showing the ball and socket bearing prior to the step of conforming the outer ring;

FIG. 2 is a transverse section taken on the line 2—2 of FIG. 1;

FIG. 3 is a section similar to FIG. 2 showing the outer ring after the forming operation; and FIG. 4 is a perspective of a strip of the bearing material.

Referring to the drawing more in detail the invention is shown as embodied in a rod end ball joint 13 having an inner spherical member 10 and an outer member 11 conforming thereto and having a partly spherical contour. A strip of bearing material 12 is disposed within the outer member 11 and is secured to the inner surface thereof with its bearing surface 14 in contact with the inner spherical member 10. The bearing is generally of standard construction with the exception of the nature of the strip 12 of bearing material which forms the low friction bearing surface and is of the general type disclosed in the above identified Kravats patent.

The strip 12 is composed of a carbon fabric woven from carbon filaments. These carbon filaments may be composed of amorphous carbon spun into continuous filament form such as a fabric known as HITCO CCA–1 manufactured by HITCO, Materials Division, 1600 W. 135th St., Gardenia, Calif., or of continuous filaments composed of crystalline graphite particles in an amorphous base such as HITCO fabric G1550.

The carbon filament strip 12 may be coated on one side with a bonding resin such as an epoxy resin which is thermosetting and is capable of bonding to the metal of the outer member 11. The coated strip may be partially cured to a nontacky state which leaves the strip in limp form which is readily subject to deformation but which is sufficiently tacky to adhere at least temporarily to the metal surface.

The strip in this state is applied to the inner surface of the outer member 11 as shown in FIGS. 1 and 2 and the inner spherical member 10 may then be inserted within the coated outer member. The assembly is then swaged as set forth in the Kravats patent above mentioned under a pressure suited to deform the outer member 11 and to cause it to conform to the outer surface of the spherical inner member 10 as shown in FIG. 3.

The carbon surface of the bearing fabric 14 is now in contact with the spherical member 10 and the resin treated surface of the fabric is held under high pressure against the surface of the outer member 11. The assembly is now placed in a suitable oven and subjected to the heat required to set the resin and in so doing to cause the epoxy resin to bond securely and permanently to the outer member 11.

The carbon surface of the fabric 14 forms a low friction bearing surface which is suitable for long continued use.

Alternatively, the fabric may be impregnated with a base resin such as a phenolic resin which may be partially cured and a coating of an epoxy or other bonding resin may be applied to one surface of the impregnated fabric after which the fabric is placed within the outer member 11 as above described and the assembly swaged and heat cured.

An open mesh backing fabric 15 may be bonded to the back surface of the carbon fabric 14 if desired for strengthening purposes. This is accomplished by applying the backing fabric 15 to one side of the carbon fabric strip before the latter is impregnated. The composite strip may then be impregnated with the base resin and a coating of the bonding resin applied to the backing fabric or the step of impregnating the fabric may be omitted and the bonding resin applied directly to the backing fabric. This embodiment provides improved fabric strength which may be desirable for certain uses.

As a further example, the carbon yarn may be coated with a dispersion of Teflon prior to weaving and the fabric may be treated with a bonding resin or impregnated with a base resin and then coated as above described. In either case any portion of the base resin which passes through to the bearing face of the fabric will be worn off as the bearing is used or may be ground off before the fabric is placed in the outer member.

As a further alternative the fabric prior to impregnation may be dipped in a dispersion of Teflon resin so as to coat the fabric with a discontinuous coating of Teflon particles. The fabric may then be coated with the bonding resin or impregnated with the base resin and then coated with the bonding resin as above set forth.

When either the yarn or the fabric is coated with Teflon the coefficient of friction is further reduced due to the low friction characteristics of the Teflon. The particular method which is selected depends upon the end use to which the bearing is to be put. For ball joints or the like which are not subjected to heavy loads the carbon fabric is usually satisfactory. Where heavy loads are to be encountered the Teflon coated yarn or fabric may be preferred.

What is claimed is:

1. A bearing comprising inner and outer bearing members having mating bearing surfaces and a fabric liner disposed between said surfaces and having one side bonded to one of said members and its other side forming a bearing surface for the other of said members, said fabric being composed of amorphous carbon filaments and a bonding resin bonding said fabric to said member.

2. A bearing as set forth in claim 1 in which graphite crystals are dispersed in said filaments.

3. A bearing as set forth in claim 1 in which said fabric is impregnated with a base resin and is secured to said bearing member by a bonding resin.

4. A bearing as set forth in claim 1 in which a backing fabric is secured to said first fabric by a bonding resin.

5. A bearing as set forth in claim 1 in which said filaments carry a coating of Teflon.

6. A bearing as set forth in claim 1 in which said fabric is coated on at least one side with a Teflon resin.

7. A bearing as set forth in claim 1 in which said fabric carries a discontinuous coating of a Teflon resin and is impregnated and bonded to said member by a bonding resin.

8. A bearing as set forth in claim 1 in which said bonding resin is an epoxy resin.

9. A bearing as set forth in claim 1 in which said fabric is impregnated with a phenolic resin and is bonded to said member by an epoxy resin.

References Cited

UNITED STATES PATENTS

| | | | |
|---|---|---|---|
| 3,421,969 | 1/1969 | Roode et al. | 308—238 |
| 3,428,374 | 2/1969 | Orkin et al. | 308—238 |
| 3,458,374 | 7/1969 | Shobert | 308—238 |

WESLEY S. RATLIFF, Jr., Primary Examiner